US012683174B2

(12) United States Patent
Park et al.

(10) Patent No.: US 12,683,174 B2
(45) Date of Patent: Jul. 14, 2026

(54) SYSTEM AND METHOD FOR ESTIMATING HYDROGEN CONCENTRATION OF FUEL CELL

(71) Applicants: Hyundai Motor Company, Seoul (KR); Kia Corporation, Seoul (KR)

(72) Inventors: Jun Young Park, Suwon-si (KR); Hee Mang Lee, Goyang-si (KR); Jae Won Jung, Suwon-si (KR); Seong Cheol Jeong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 773 days.

(21) Appl. No.: 17/993,431

(22) Filed: Nov. 23, 2022

(65) Prior Publication Data

US 2023/0411652 A1 Dec. 21, 2023

(30) Foreign Application Priority Data

Jun. 16, 2022 (KR) ......................... 10-2022-0073569

(51) Int. Cl.
H01M 8/04082 (2016.01)
H01M 8/04746 (2016.01)
H01M 8/04791 (2016.01)

(52) U.S. Cl.
CPC ... H01M 8/04197 (2016.02); H01M 8/04753 (2013.01); H01M 8/04798 (2013.01)

(58) Field of Classification Search
CPC ......... H01M 8/04197; H01M 8/04753; H01M 8/04798; H01M 8/04; H01M 8/04231; H01M 8/04388; H01M 8/04447; H01M 8/04664; H01M 8/04992
See application file for complete search history.

(56) References Cited

U.S. PATENT DOCUMENTS

| | | | |
|---|---|---|---|
| 2018/0166717 A1* | 6/2018 | Ryu | H01M 8/04671 |
| 2021/0104760 A1* | 4/2021 | Kwon | H01M 8/04447 |
| 2021/0135259 A1* | 5/2021 | Park | H01M 8/04671 |
| 2021/0151784 A1* | 5/2021 | Han | H01M 8/04231 |

FOREIGN PATENT DOCUMENTS

| | | |
|---|---|---|
| KR | 20130060741 A | 6/2013 |
| KR | 20190108304 A | 9/2019 |
| KR | 201901083004 A | 9/2019 |

* cited by examiner

*Primary Examiner* — Stewart A Fraser
(74) *Attorney, Agent, or Firm* — MORGAN, LEWIS & BOCKIUS LLP

(57) ABSTRACT

A system and a method for estimating a hydrogen concentration of a fuel cell include the fuel cell, a discharge line connected to an outlet side of a fuel cell hydrogen electrode while connecting the fuel cell to an exterior of the fuel cell, for communication between the fuel cell and the exterior of the fuel cell, a discharge valve provided at the discharge line and configured to adjust the communication between the fuel cell and the exterior of the fuel cell, and a controller configured to cut off the discharge valve during operation of the fuel cell, to check occurrence of degradation of the fuel cell, and to correct a crossover coefficient value of the fuel cell in accordance with a level of the degradation in the fuel cell when the degradation of the fuel cell has occurred, estimating a hydrogen concentration in an interior of the fuel cell.

14 Claims, 3 Drawing Sheets degradation rate
of fuel cell $R_{Max}$ $0$ $V_{Min}$ $V_{Max}$ reduction variation amount of
gas discharge amount

SYSTEM AND METHOD FOR ESTIMATING HYDROGEN CONCENTRATION OF FUEL CELL

CROSS-REFERENCE TO RELATED APPLICATION

The present application claims priority to Korean Patent Application No. 10-2022-0073569, filed on Jun. 16, 2022, the entire contents of which is incorporated herein for all purposes by this reference.

BACKGROUND OF THE PRESENT DISCLOSURE

Field of the Present Disclosure

The present disclosure relates to a system and a method for estimating a hydrogen concentration of a fuel cell which are capable of checking occurrence of degradation of the fuel cell in a state of cutting off a discharge valve during operation of the fuel cell, and correcting a crossover coefficient value of the fuel cell in accordance with a level of the degradation of the fuel cell when the degradation of the fuel cell has occurred, enhancing accuracy in estimation of a hydrogen concentration in an interior of the fuel cell.

Description of Related Art

A fuel cell system includes a hydrogen supply system, an air supply system, etc. In addition to a fuel cell configured to produce electrical energy using chemical reaction of hydrogen and oxygen supplied thereto.

As hydrogen is supplied to a hydrogen electrode of a fuel cell, and oxidation of the supplied hydrogen proceeds at the hydrogen electrode, hydrogen ions and electrons are generated. The generated hydrogen ions and electrons migrate to an air electrode through an electrolyte membrane and a separation plate, respectively. At the air electrode, the hydrogen ions and electrons migrating from the hydrogen electrode, and oxygen in air generate electrochemical reaction, and accordingly, water is produced and electrical energy is generated in accordance with a flow of electrons.

In the instant case, hydrogen supplied to the fuel cell hydrogen electrode of the fuel cell is required to maintain a hydrogen concentration of an appropriate level. To the present end, appropriate purge control for hydrogen may be performed. When the concentration of hydrogen present at the fuel cell hydrogen electrode of the fuel cell is low, degradation of the fuel cell occurs due to such an insufficient hydrogen concentration. Furthermore, there is a problem in that a reduction in durability of the fuel cell occurs due to the degradation of the fuel cell. Conversely, when the concentration of hydrogen present at the fuel cell hydrogen electrode of the fuel cell is high, the amount of hydrogen crossing over to the air electrode of the fuel cell is increased. Due to the increase in the amount of crossing-over hydrogen, there are problems in that the fuel economy of the fuel cell is degraded, and the concentration of hydrogen discharged during purge is high.

In a conventional case, a hydrogen concentration estimator configured to estimate a hydrogen concentration of a hydrogen electrode of a fuel cell is provided, and a gas discharge amount estimator configured to estimate an amount of gas discharged during purge and drainage of the fuel cell is provided. By the provision of the hydrogen concentration estimator and the gas discharge amount estimator, hydrogen concentration control for the fuel cell hydrogen electrode of the fuel cell is performed. In such a conventional case, however, there is a problem in that hydrogen concentration of the fuel cell hydrogen electrode may be controlled to be higher or lower than an actual hydrogen concentration of the fuel cell hydrogen electrode because hydrogen concentration control is performed under the condition that whether or not occurrence of degradation of the fuel cell has occurred is not checked. Furthermore, as hydrogen concentration of the fuel cell hydrogen electrode may be controlled to be higher or lower than the actual hydrogen concentration of the fuel cell hydrogen electrode, there may be a problem in that the hydrogen concentration of the fuel cell hydrogen electrode may be maintained in an excessive or insufficient state.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and a method for estimating a hydrogen concentration of a fuel cell which are configured for checking occurrence of degradation of the fuel cell in a state of cutting off a discharge valve during operation of the fuel cell, and correcting a crossover coefficient value of the fuel cell in accordance with a level of the degradation of the fuel cell when the degradation of the fuel cell has occurred, enhancing accuracy in estimation of a hydrogen concentration in an interior of the fuel cell.

In accordance with an aspect of the present disclosure, the above and other objects may be accomplished by the provision of a system for estimating a hydrogen concentration of a fuel cell, the system including the fuel cell, a discharge line connected to an outlet side of a fuel cell hydrogen electrode while connecting the fuel cell to an exterior of the fuel cell, for communication between the fuel cell and the exterior of the fuel cell, a discharge valve provided at the discharge line and configured to adjust the communication between the fuel cell and the exterior of the fuel cell, and a controller configured to cut off the discharge valve during operation of the fuel cell, to check occurrence of degradation of the fuel cell, and to correct a crossover coefficient value of the fuel cell in accordance with a level of the degradation in the fuel cell when the degradation of the fuel cell has occurred, estimating a hydrogen concentration in an interior of the fuel cell.

The controller may estimate a discharge amount of gas discharged through the discharge line during operation of the fuel cell, may cut off the discharge valve after estimation of the gas discharge amount, and may then check occurrence of degradation of the fuel cell.

The system may further include a hydrogen supply line connected to the fuel cell hydrogen electrode and configured to supply hydrogen to the fuel cell, and a pressure sensor provided at the hydrogen supply line and configured to measure a pressure of the hydrogen supply line. The controller may be configured to determine a hydrogen supply amount based on the pressure measured through the pressure sensor, and may estimate a gas discharge amount in a state of reflecting the determined hydrogen supply amount.

The controller may be configured to determine a reduction amount reduced from the estimated gas discharge amount for a reference time after cut-off of the discharge valve, and may then determine whether or not degradation of the fuel cell has occurred, based on the determined reduction amount.

The controller may be configured to determine a difference between the reduction amount of the gas discharge amount and a reference reduction amount of the gas discharge amount as a reduction variation amount, and may then determine that degradation has occurred in the fuel cell, when the determined reduction variation amount is greater than the reference reduction variation amount.

The reference reduction amount of the gas discharge amount may be a reduction amount of the gas discharge amount for the reference time in an initial state in which the fuel cell is not aged.

The reference reduction variation amount may be a minimum value of a reduction variation amount of the gas discharge amount when degradation occurs in the fuel cell.

The controller may derive a degradation rate of the fuel cell based on the reduction variation amount determined when degradation has occurred in the fuel cell, checking a degradation level of the fuel cell.

The controller may be provided with a data map using, as an input thereof, a reduction variation amount of a gas discharge amount, and as an output thereof, a degradation rate of the fuel cell according to the reduction variation amount of the gas discharge amount.

The controller may correct a crossover coefficient value of the fuel cell based on the derived degradation rate of the fuel cell, and may estimate a hydrogen concentration of the fuel cell hydrogen electrode in the interior of the fuel cell based on the corrected crossover coefficient value.

In accordance with another aspect of the present disclosure, there is provided a method for estimating a hydrogen concentration of a fuel cell, the method including estimating, by a controller, a gas discharge amount discharged through a discharge line during operation of the fuel cell, cutting off, by the controller, a discharge valve after estimation of the gas discharge amount, and then checking, by the controller, occurrence of degradation of the fuel cell, correcting, by the controller, a crossover coefficient value of the fuel cell when the degradation of the fuel cell has occurred, and estimating, by the controller, a hydrogen concentration in an interior of the fuel cell, based on the corrected crossover coefficient value.

In the estimating the gas discharge amount, the controller may be configured to determine a hydrogen supply amount based on a pressure measured by a pressure sensor, and may estimate the gas discharge amount in a state of reflecting the determined hydrogen supply amount.

In the checking occurrence of degradation of the fuel cell, the controller may be configured to determine a reduction amount reduced from the estimated gas discharge amount for a reference time after cut-off of the discharge valve, and may then determine a difference between the reduction amount of the gas discharge amount and a reference reduction amount of the gas discharge amount, as a reduction variation amount.

In the checking occurrence of degradation of the fuel cell, the controller may compare the reduction variation amount of the gas discharge amount with a reference reduction variation amount, and may determine that degradation of the fuel cell has occurred, when the reduction variation amount of the gas discharge amount is greater than the reference reduction variation amount.

In the correcting the crossover coefficient value of the fuel cell, the controller may derive a degradation rate of the fuel cell based on the reduction variation amount of the gas discharge amount, when the degradation of the fuel cell has occurred, and may then correct the crossover coefficient value of the fuel cell based on the derived degradation rate of the fuel cell.

In the estimating the hydrogen concentration in the interior of the fuel cell, the controller may be configured to determine a diffusion coefficient caused by crossover of the fuel cell, using the corrected crossover coefficient value, and may then estimate the hydrogen concentration of the fuel cell hydrogen electrode in the interior of the fuel cell, based on the determined diffusion coefficient.

In accordance with the hydrogen concentration estimation system and method for the fuel cell according to the exemplary embodiments of the present disclosure, there is an effect of enhancing accuracy in estimation of a hydrogen concentration in an interior of the fuel cell by checking occurrence of degradation of the fuel cell during operation of the fuel cell, and estimating a hydrogen concentration in the interior of the fuel cell in a state of reflecting a degradation level of the fuel cell.

Furthermore, in accordance in accordance with an enhancement in accuracy in estimation of the hydrogen concentration in the interior of the fuel cell, there are effects of preventing a phenomenon in which a hydrogen concentration of a fuel cell hydrogen electrode is insufficient, and preventing a reduction in durability of the fuel cell caused by degradation of the fuel cell.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
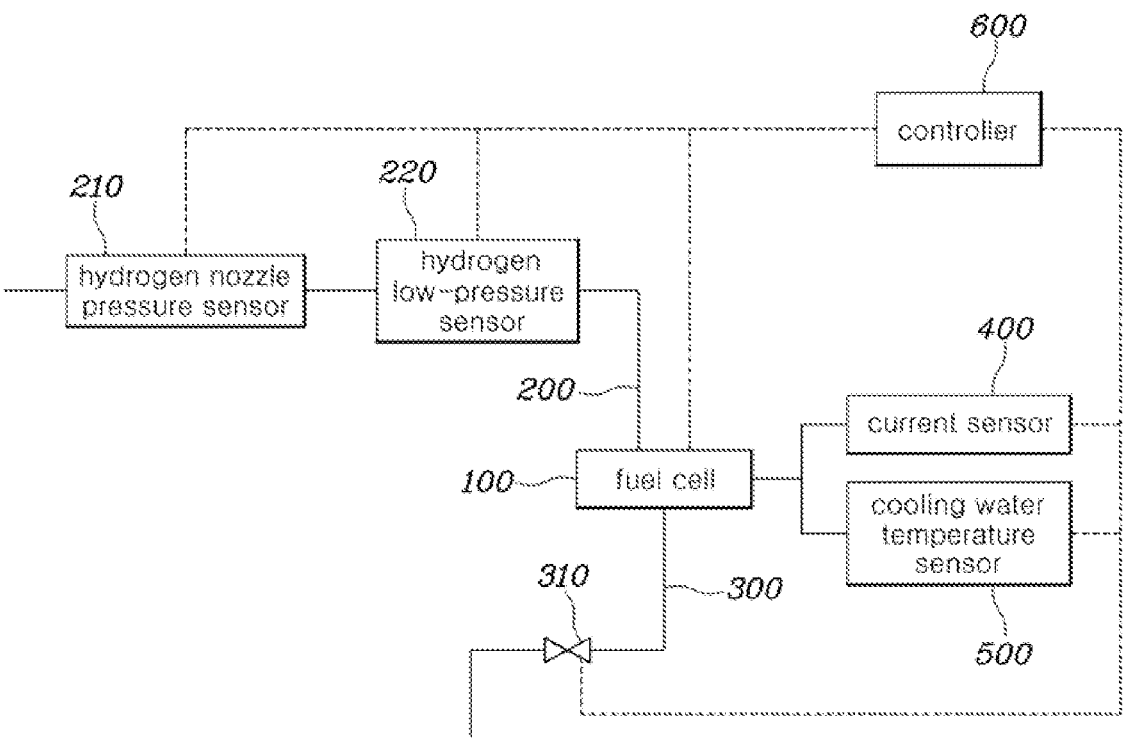
FIG. 1 is a diagram of a configuration of a system for estimating a hydrogen concentration of a fuel cell in accordance with an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the FIGURES, reference numbers refer to the same or equivalent parts of the present disclosure throughout the several FIGURES of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, when a detailed description of well-known functions or configurations related to the present specification is determined to unnecessarily cloud a gist of the inventive concept, the detailed description thereof will be omitted. Furthermore, the present disclosure will be described below through a detailed description illustrated in the accompanying drawings. The detailed description is not intended to limit the present disclosure and it should be understood that the present disclosure includes all changes, equivalents, or substitutions within the spirit and scope of the present disclosure.

It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

It should be understood that, throughout the specification, "comprising", "including" or the like is intended to express the existence of characteristics, numerals, steps, operations, constituent elements, parts, or the combination thereof, and does not exclude another characteristics, numeral, step, operation, element, part, or any combination thereof, or any addition thereto.

Hereinafter, embodiments included in the specification will be described in detail with reference to the accompanying drawings. Wherever possible, the same reference numbers will be used throughout the drawings to refer to the same or like parts, and overlapping descriptions thereof will be omitted.

Figure 2:
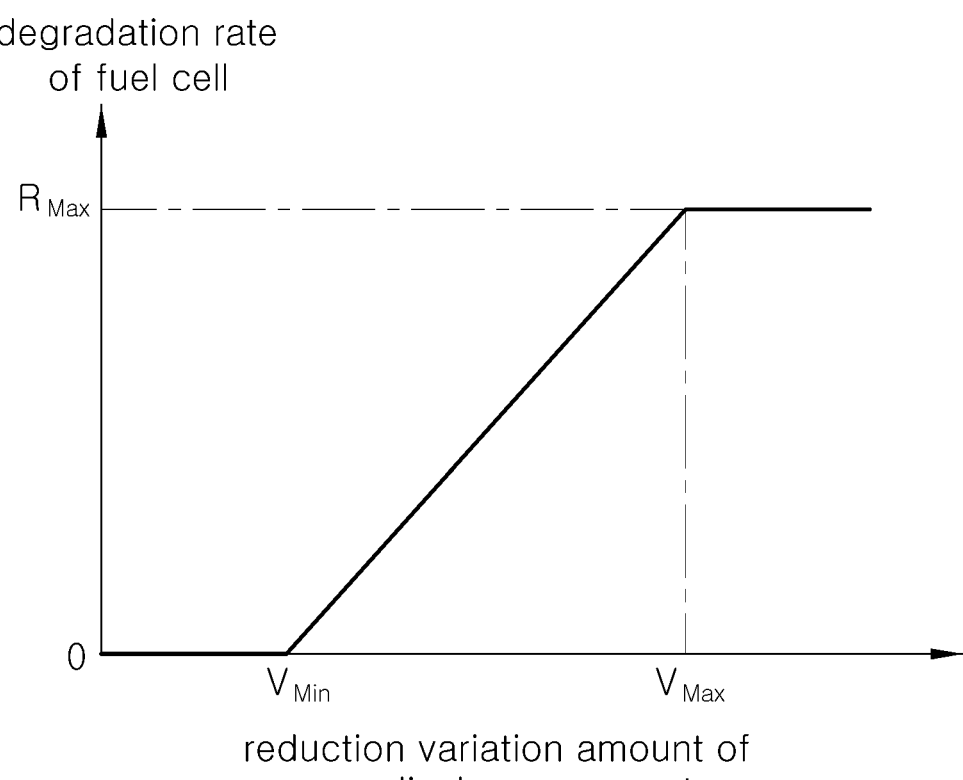
FIG. 2 is a graph depicting a variation in degradation rate of a fuel cell according to a variation in reduction rate of a gas discharge amount in the fuel cell hydrogen concentration estimation system according to the exemplary embodiment of the present disclosure.
Figure 3:
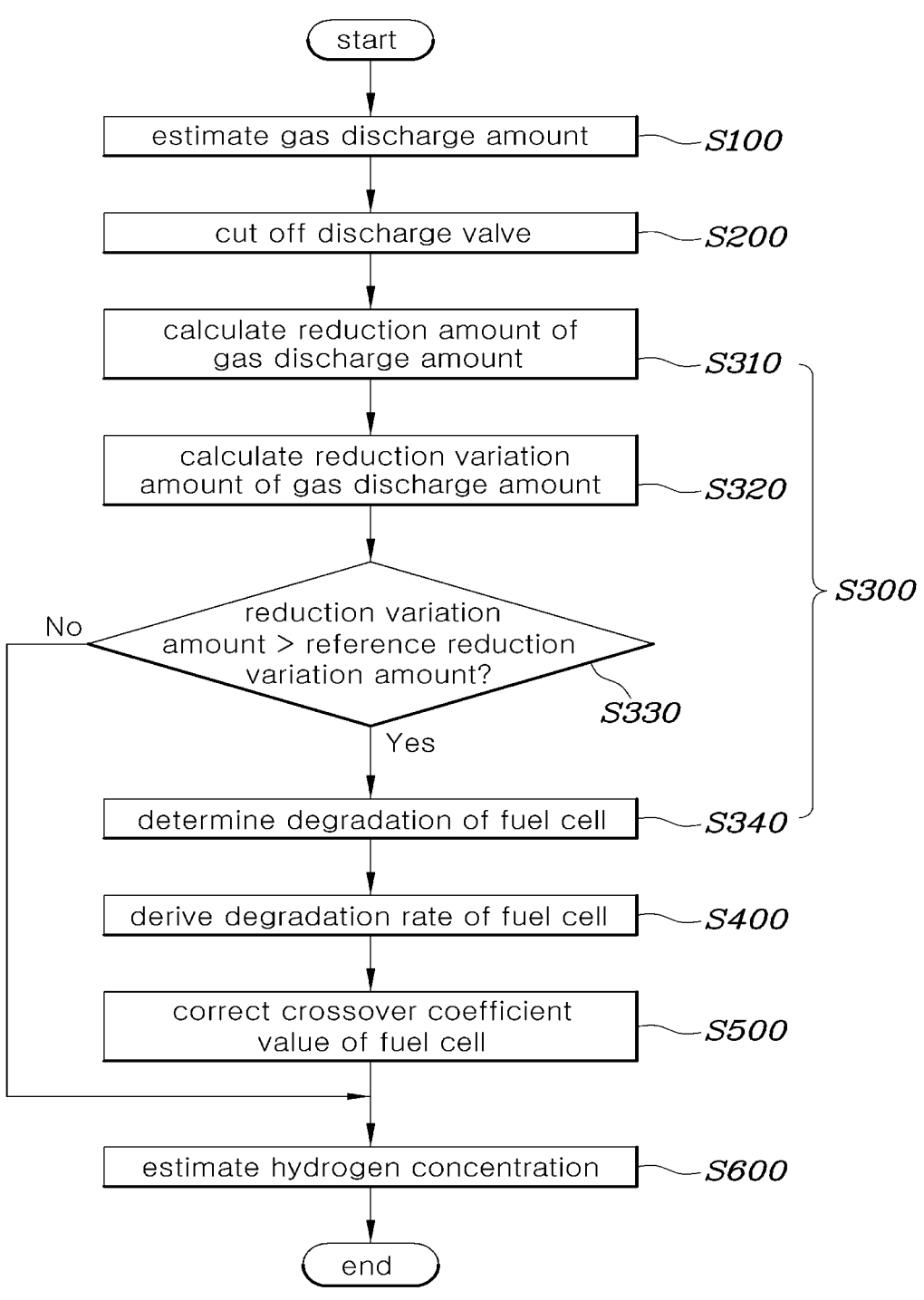
FIG. 3 is a flowchart of a method for estimating a hydrogen concentration of a fuel cell in accordance with an exemplary embodiment of the present disclosure.

FIG. 1 is a diagram of a configuration of a system for estimating a hydrogen concentration of a fuel cell in accordance with an exemplary embodiment of the present disclosure. FIG. 2 is a graph depicting a variation in degradation rate of a fuel cell according to a variation in reduction rate of a gas discharge amount in the fuel cell hydrogen concentration estimation system according to the exemplary embodiment of the present disclosure. FIG. 3 is a flowchart of a method for estimating a hydrogen concentration of a fuel cell in accordance with an exemplary embodiment of the present disclosure.

FIG. 1 shows a configuration of a system for estimating a hydrogen concentration of a fuel cell in accordance with an exemplary embodiment of the present disclosure. The system for estimating a hydrogen concentration of a fuel cell in accordance with the exemplary embodiment of the present disclosure includes a fuel cell 100, a discharge line 300 connected to an outlet side of a fuel cell hydrogen electrode while connecting the fuel cell 100 to an exterior of the fuel cell 100, for communication between the fuel cell 100 and the exterior of the fuel cell 100, a discharge valve 310 provided at the discharge line 300 and configured to adjust the communication between the fuel cell 100 and the exterior of the system, and a controller 600 configured to cut off the discharge valve 310 during operation of the fuel cell 100, to check occurrence of degradation of the fuel cell 100, and to correct a crossover coefficient value of the fuel cell 100 in accordance with a level of the degradation in the fuel cell when degradation of the fuel cell 100 has occurred, estimating a hydrogen concentration in an interior of the fuel cell 100.

In accordance with an exemplary embodiment of the present disclosure, the controller 600 may be implemented through a non-volatile memory configured to store an algorithm configured to control operations of various constituent elements of a vehicle or data as to software commands for reproduction of the algorithm, and a processor configured to execute an operation, which will be described later, using data stored in the memory. Here, the memory and the processor may be implemented in a form of individual chips, respectively. Alternatively, the memory and the processor may be implemented in a form of an integrated single chip, and the processor may take the form of one or more processors.

For normal electricity generation of the fuel cell 100, a fuel cell system may supply hydrogen and air in amounts needed upon reaction of the fuel cell 100. When the hydrogen concentration of a hydrogen electrode in the fuel cell 100 is low, degradation of the fuel cell 100 may occur due to an insufficient hydrogen concentration, and a problem of durability reduction of the fuel cell 100 may occur due to such degradation. Furthermore, when the hydrogen concentration of the fuel cell hydrogen electrode in the fuel cell 100 is high, the amount of hydrogen crossing over from the fuel cell hydrogen electrode of the fuel cell 100 to an air electrode of the fuel cell 100 is increased, and accordingly, the hydrogen amount required for electricity generation of the fuel cell 100 may be insufficient. As a result, there may be a problem of degradation in electricity generation efficiency. To eliminate such problems, therefore, supply of hydrogen to the fuel cell 100 may be adjusted so that the hydrogen concentration of the fuel cell hydrogen electrode of the fuel cell 100 is appropriately maintained, by estimating the hydrogen concentration of the fuel cell hydrogen electrode.

In the instant case, however, there may be a problem in that a variation in hydrogen concentration caused by degradation of the fuel cell 100 is not reflected in estimation of the hydrogen concentration of the fuel cell hydrogen electrode. When degradation of the fuel cell 100 occurs, a cross-over phenomenon caused by the degradation is increased in the fuel cell 100, and accordingly, there may be a problem in that the hydrogen concentration may be estimated to be higher or lower than an actual hydrogen concentration. Furthermore, as the hydrogen concentration of the fuel cell hydrogen electrode is estimated to be higher or lower than the actual hydrogen concentration, the hydrogen concentration of the fuel cell hydrogen electrode may be maintained in an insufficient state, and accordingly, degradation of the fuel cell 100 may be accelerated. As a result, there is a problem in that durability of the fuel cell 100 may be reduced. To the present end, in accordance with the exemplary embodiment of the present disclosure, whether or not degradation of the fuel cell 100 has occurred is determined, a level of the degradation is checked when degradation of the fuel cell 100 has occurred, and the hydrogen concentration of the fuel cell hydrogen electrode is then estimated based on the checked degradation level.

The controller 600 is required to estimate a gas discharge amount to determine whether or not degradation of the fuel cell 100 has occurred. The controller 600 estimates a discharge amount of gas discharged through the discharge line 300 during operation of the fuel cell 100, cuts off the discharge valve 310 after estimation of the gas discharge amount, and then checks occurrence of degradation of the fuel cell 100. The controller 600 estimates a discharge amount of gas discharged from the fuel cell hydrogen electrode through the discharge line 300.

Referring to FIG. 1, the hydrogen concentration estimation system for the fuel cell 100 further includes a hydrogen supply line 200 connected to the fuel cell hydrogen electrode and configured to supply hydrogen to the fuel cell 100, and pressure sensors 210 and 220 provided at the hydrogen supply line 200 and configured to measure a pressure of the hydrogen supply line 200. Furthermore, the controller 600 determines a hydrogen supply amount based on the pressure measured through the pressure sensors 210 and 220, and estimates a gas discharge amount in a state of reflecting the determined hydrogen supply amount. The pressure sensors 210 and 220 may include a hydrogen nozzle pressure sensor 210 and a hydrogen low-pressure sensor 220. The controller 600 determines a hydrogen supply amount based on a pressure measured through the hydrogen nozzle pressure sensor 210 and the hydrogen low-pressure sensor 220. The controller 600 may be provided with a flow rate conversion map using, as an input thereof, a pressure measured through the hydrogen nozzle pressure sensor 210 and the hydrogen low-pressure sensor 220, and as an output thereof, a hydrogen supply amount corresponding to the measured pressure. Using the flow rate conversion map, the controller 600 may determine a hydrogen supply amount. Furthermore, the controller 600 may determine the hydrogen supply amount by substituting the pressure measured through the hydrogen nozzle pressure sensor 210 and the hydrogen low-pressure sensor 220 into a flow rate conversion formula.

Meanwhile, the controller 600 may estimate a gas discharge amount in a state of reflecting not only the hydrogen supply amount, but also a hydrogen consumption amount and a residual gas amount. The gas discharge amount may be estimated as a value obtained by deducting the hydrogen consumption amount and the residual gas amount from the hydrogen supply amount. In an exemplary embodiment of the present disclosure, the hydrogen concentration estimation system for the fuel cell 100 may further include a current sensor 400 and a cooling water temperature sensor 500. The controller 600 may measure electricity generation current of the fuel cell 100 through the current sensor 400, and may determine a hydrogen consumption amount based on the measured electricity generation current. Referring to the related art, an amount of hydrogen consumed per minute in the fuel cell 100 may be determined through the following Expression 1:

$$\text{Hydrogen Consumption Amount per Minute} = (\text{Stack Current} * \text{Number of Stack Cells} * R * T_s * 60) / (2 * F) \quad [\text{Expression 1}]$$

In Expression 1, "R" represents an ideal gas constant, "$T_s$" represents an absolute temperature corresponding to 0° C., and "F" represents a Faraday constant. The stack current represents electricity generation current of the fuel cell 100 measured by the current sensor 400, and the number of stack cells represents the number of cells forming the fuel cell 100. The controller 600 may determine the hydrogen consumption amount consumed in the fuel cell 100, through Expression 1 as described above.

Furthermore, the controller 600 may measure a cooling water temperature at an outlet side of the fuel cell 100 through the cooling water temperature sensor 500, and may determine a residual gas amount based on the measured outlet-side cooling water temperature and a pressure variation amount of the fuel cell 100 measured by the hydrogen low-pressure sensor 220. Referring to the related art, the residual gas amount remaining in the fuel cell 100 may be determined through the following Expression 2:

$$\text{Residual Gas Amount} = (\text{Hydrogen Electrode Pressure Variation Amount} * \text{Hydrogen Electrode Volume} * T_s) / (\text{Stack Temperature} * P_s) \quad [\text{Expression 2}]$$

In Expression 2, "$T_s$" represents an absolute temperature corresponding to 0° C., and "$P_s$" represents 100 kPa. The fuel cell hydrogen electrode pressure variation amount represents a pressure variation amount of the fuel cell 100 measured by the hydrogen low-pressure sensor 220, and the stack temperature represents a temperature of the fuel cell 100 measured through the cooling water temperature sensor 500. The controller 600 may determine the residual gas amount remaining in the fuel cell 100 through Expression 2 as described above. Accordingly, the controller 600 may estimate a gas discharge amount based on the hydrogen supply amount, the consumed hydrogen amount and the residual gas amount.

Thereafter, the controller 600 determines a reduction amount reduced from the estimated gas discharge amount for a reference time after cut-off of the discharge valve 310, and then determines whether or not degradation of the fuel cell 100 has occurred, based on the determined reduction amount. The controller 600 cuts off the discharge valve 310 after completion of estimation of the gas discharge amount. When the controller 600 cuts off the discharge valve 310, the fuel cell hydrogen electrode of the fuel cell 100 does not communicate with the exterior of the fuel cell 100, and the discharge amount of gas discharged through the discharge line 300 should be maintained to be an amount estimated before cut-off of the discharge valve 310. However, a crossover phenomenon may occur between the fuel cell hydrogen electrode and the air electrode in the fuel cell 100 after cut-off of the discharge valve 310.

When hydrogen present at the fuel cell hydrogen electrode of the fuel cell 100 crosses over to the air electrode after cut-off of the discharge valve 310, the estimated gas discharge amount may be reduced due to a reduction in hydrogen concentration of the fuel cell hydrogen electrode. Furthermore, when degradation of the fuel cell 100 has occurred, the amount of hydrogen crossing over from the fuel cell hydrogen electrode to the air electrode in the fuel cell 100 is increased, as compared to a normal state, and, accordingly, the estimated gas discharge amount is further reduced. For the present reason, it is necessary to set a reference time and to determine a reduction amount reduced from the estimated gas discharge amount for the reference time after cut-off of the discharge valve 310. Furthermore, the controller 600 checks whether or not degradation of the fuel cell 100 has occurred, using the reduction amount of the gas discharge amount.

The controller 600 determines a difference between the reduction amount of the gas discharge amount and a reference reduction amount of the gas discharge amount as a reduction variation amount, and then determines that degradation has occurred in the fuel cell 100, when the determined reduction variation amount is greater than a reference reduction variation amount. The controller 600 determines a difference between the determined reduction amount of the gas discharge amount and the refence reduction amount of the gas discharge amount as a reduction variation amount. The reference reduction amount of the gas discharge amount represents a reduction amount of the gas discharge amount for the reference time in an initial state in which the fuel cell 100 is not aged. In an exemplary embodiment of the present disclosure, the initial state in which the fuel cell 100 is not aged may be a state in which the number of electricity generation times of the fuel cell 100 does not exceed a minimum number of times after the fuel cell 100 is first mounted in a fuel cell system. Furthermore, in an exemplary embodiment of the present disclosure, the minimum number of electricity generation times of the fuel cell 100 may be set to 5 times, and the controller 600 may determine a reference reduction amount of the gas discharge amount in a state in which the number of electricity generation times of the fuel cell 100 does not exceed the minimum number of times. Furthermore, the controller 600 may store the determined reference reduction amount in a separate non-volatile memory to use the stored reference reduction amount upon determining a reduction variation amount.

Furthermore, the reference reduction variation amount represents a minimum value of a reduction variation amount of the gas discharge amount when degradation occurs in the fuel cell 100. When degradation of the fuel cell 100 occurs, a reduction amount of a gas discharge amount may be varied due to an increase in a crossover amount in the interior of the fuel cell 100. To the present end, it is necessary for the controller 600 to set a minimum value of the reduction variation amount of the gas discharge amount as a reference reduction variation amount, and to determine that degradation has occurred in the fuel cell 100, when the determined reduction variation amount of the gas discharge amount is greater than the reference reduction variation amount.

Thereafter, the controller 600 derives a degradation rate of the fuel cell 100 based on the reduction variation amount determined when degradation has occurred in the fuel cell 100, checking a degradation level of the fuel cell 100. The controller 600 is required to reflect occurrence of degradation in the fuel cell 100, upon estimating a hydrogen concentration in the interior of the fuel cell 100. When degradation occurs in the fuel cell 100, crossover may be generated in the interior of the fuel cell 100, and the hydrogen concentration in the interior of the fuel cell 100 may be increased or decreased due to the crossover. Therefore, the controller 600 is required to check a degradation level according to occurrence of degradation in the fuel cell 100, to enhance accuracy of hydrogen concentration estimation in a state in which degradation of the fuel cell 100 has occurred. To the present end, the controller 600 checks a degradation level of the fuel cell 100 based on a previously-determined reduction variation amount of a gas discharge amount.

To derive a degradation rate of the fuel cell 100 based on a reduction variation amount of a gas discharge amount, the controller 600 is provided with a data map using, as an input thereof, a reduction variation amount of a gas discharge amount, and as an output thereof, a degradation rate of the fuel cell 100 according to the reduction variation amount of the gas discharge amount. The data map includes data obtained through experiments. A situation in which degradation has occurred in the fuel cell 100 is established, and a reduction variation amount of a gas discharge amount in the fuel cell 100 according to a degradation rate of the fuel cell 100 is then measured after cut-off of the discharge valve 310.

Thereafter, the measured degradation rate of the fuel cell 100 according to the reduction variation amount of the gas discharge amount is previously stored in the controller 600 in a form of a data map. Thus, the controller 600 may derive a degradation rate of the fuel cell 100 according to a reduction variation amount of a gas discharge amount, through the data map.

Furthermore, the controller 600 checks a degradation level of the fuel cell 100 based on the derived degradation rate of the fuel cell 100. FIG. 2 shows a degradation rate variation graph of the fuel cell 100 according to a reduction variation amount of a gas discharge amount in the hydrogen concentration estimation system for the fuel cell 100 according to the exemplary embodiment of the present disclosure. In FIG. 2, "V" represents a reduction variation amount of a gas discharge amount, and "R" represents a degradation rate of the fuel cell 100. "$V_{Min}$" represents a reference reduction variation amount of a gas discharge amount when degradation of the fuel cell 100 occurs, and "$V_{Max}$" represents a maximum reduction variation amount of a gas discharge amount when the fuel cell 100 has been degraded to $R_{Max}$. Referring to FIG. 2, it may be seen that, as the reduction variation amount of the gas discharge amount increases, the degradation rate of the fuel cell 100 is also increased. An increase in degradation rate of the fuel cell 100 means an increase in degradation level of the fuel cell 100. Furthermore, in accordance in accordance with an increase in degradation rate of the fuel cell 100, the amount of gas crossing over in the interior of the fuel cell 100 is increased, and accordingly, a reduction variation amount of a gas discharge amount is also increased.

Thereafter, the controller 600 corrects a crossover coefficient value of the fuel cell 100 based on the derived degradation rate of the fuel cell 100, and then estimates a hydrogen concentration of the fuel cell hydrogen electrode in the interior of the fuel cell 100 based on the corrected crossover coefficient value. The controller 600 corrects the crossover coefficient value of the fuel cell 100 based on the degradation rate of the fuel cell 100 derived using the following Expression 3:

$$K' = k(1 + R) \qquad \text{[Expression 3]}$$

In Expression 3, "k" represents an existing crossover coefficient value of the fuel cell 100, and "R" represents a degradation rate of the fuel cell 100. Furthermore, "K" represents a corrected crossover coefficient value of the fuel cell 100. The controller 600 corrects the crossover coefficient value of the fuel cell 100 through Expression 3, and estimates the hydrogen concentration of the fuel cell hydrogen electrode in the interior of the fuel cell 100 based on the corrected crossover coefficient value.

Hereinafter, estimation of a hydrogen concentration of the fuel cell hydrogen electrode in the interior of the fuel cell 100 will be briefly mentioned with reference to the related art. Generally, a diffusion coefficient according to crossover generated in the fuel cell 100 is determined upon estimation of a hydrogen concentration of the fuel cell hydrogen electrode in the interior of the fuel cell 100. Thereafter, the number of moles of a gas crossing over in the fuel cell 100 is determined using the determined diffusion coefficient, and the number of moles of hydrogen at the fuel cell hydrogen electrode is then determined based on the determined number of moles of the gas, estimating a hydrogen concentration. In in accordance with the exemplary embodiment of the present disclosure, however, a degradation level of the fuel cell 100 is reflected in a hydrogen concentration estimation procedure for the fuel cell hydrogen electrode in the interior of the fuel cell 100 in the related art, and accordingly, variation is applied to determination of a diffusion coefficient according to crossover generated in the fuel cell 100.

Referring to the related art, diffusion coefficients according to crossover of hydrogen and nitrogen produced in the interior of the fuel cell 100 may be determined through the following Expression 4:

$$D_{H_2} = K_{H_2} e^{\frac{E_{H_2}}{R}\left(\frac{1}{333.15} - \frac{1}{T}\right)} \qquad \text{[Expression 4]}$$

$$D_{H_2} = K_{N_2} e^{\frac{E_{N_2}}{R}\left(\frac{1}{333.15} - \frac{1}{T}\right)}$$

In Expression 4, "$D_{H_2}$" and "$D_{N_2}$" represent diffusion coefficients of hydrogen and nitrogen according to crossover, respectively, "$E_{H_2}$" represents activation energy of hydrogen, and "$E_{N_2}$" represents activation energy of nitrogen. Furthermore, "$K_{H_2}$" and "$K_{N_2}$" represent crossover coefficient values of hydrogen and nitrogen in the fuel cell 100, which are coefficient values corrected in accordance with a degradation level of the fuel cell 100, respectively. It may be possible to enhance accuracy in determination of a diffusion coefficient according to crossover generated in the fuel cell 100 by use of a crossover coefficient value corrected in accordance with a degradation level of the fuel cell 100 when degradation has occurred in the fuel cell 100.

After completion of determination of the diffusion coefficient according to the crossover, the controller 600 determines numbers of moles of nitrogen and vapor crossing over per hour in the fuel cell 100, through the following Expression 5:

$$\dot{n}_{N_2\_XO} = \frac{D_{N_2}}{RT}\frac{P_{Ca,N_2} - P_{An,N_2}}{\delta}A \qquad \text{[Expression 5]}$$

$$\dot{n}_{V\_XO} = \frac{D_V}{RT}\frac{P_{Ca,V} - P_{An,V}}{\delta}A$$

In Expression 5, the subscript "V" represents vapor, and the subscript "XO" represents crossover. "A" represents a specific catalyst area of an electrolyte membrane in the interior of the fuel cell 100, and "$\delta$" represents a diffusion distance of each gas. After determination of the numbers of moles of nitrogen and vapor crossing over per hour in the fuel cell 100, the controller 600 determines the number of moles of the entire gas purged due to a pressure difference between the pressure of the fuel cell hydrogen electrode of the fuel cell 100 and the pressure at an outlet side of the air electrode of the fuel cell 100. Thereafter, the controller 600 determines numbers of nitrogen and vapor discharged due to the purge, through the following Expression 6:

$$\dot{n}_{purge} = C(P_{An} - P_{stk\_out}) \qquad \text{[Expression 6]}$$

$$\dot{n}_{N_2\_purge} = y_{N_2}\dot{n}_{purge}, \; y_{N_2} = \frac{n_{N_2}}{n_{An}}$$

$$\dot{n}_{V\_purge} = y_V\dot{n}_{purge}, \; y_V = \frac{n_V}{n_{An}}$$

$$n_{An} = \frac{P_{An}V_{An}}{RT}$$

In Expression 6, "C" represents a purge constant. After determination of the numbers of moles of nitrogen and vapor purged at the fuel cell hydrogen electrode of the fuel cell 100 through Expression 6 as described above, the controller 600 determines numbers of moles of nitrogen and vapor remaining at the fuel cell hydrogen electrode. The controller 600 may determine the numbers of moles of nitrogen and vapor remaining at the fuel cell hydrogen electrode of the fuel cell 100 by adding the number of moles according to the crossover to the number of moles, which was present at the fuel cell hydrogen electrode in an initial stage, and then deducting the number of purged moles from the resultant value, through Expression 7:

$$n_{N_2} = n_{N_2\_init} + \int (\dot{n}_{N_2\_XO} - \dot{n}_{N_2\_purge})dt \qquad \text{[Expression 7]}$$

$$n_V = n_{V\_init} + \int (\dot{n}_{V\_XO} - \dot{n}_{V\_purge})dt$$

The number of moles of the entire gas present at the fuel cell hydrogen electrode of the fuel cell 100 may correspond to a value obtained by summing all of the numbers of moles of hydrogen, nitrogen and vapor. Accordingly, the controller 600 may determine the number of moles of hydrogen present at the fuel cell hydrogen electrode of the fuel cell 100 using the determined numbers of moles of nitrogen and vapor, through Expression 8.

$$\frac{n_{H_2}}{n_{An}} = 1 - \frac{n_{N_2}}{n_{An}} - \frac{n_V}{n_{An}} \qquad \text{[Expression 8]}$$

The controller 600 may estimate the concentration of hydrogen present at the fuel cell hydrogen electrode of the fuel cell 100 by determining the ratio of the number of moles of hydrogen to the number of moles of the entire gas present at the hydrogen electrode. Furthermore, a degradation level of the fuel cell 100 is reflected in estimation of the hydrogen concentration of the fuel cell hydrogen electrode in the interior of the fuel cell 100, and accordingly, there is an effect of enhancing accuracy of estimation of the hydrogen concentration of the fuel cell hydrogen electrode even when crossover is generated between both electrodes of the fuel cell 100 due to occurrence of degradation of the fuel cell 100.

Meanwhile, FIG. 3 shows a flowchart of a hydrogen concentration estimation method for a fuel cell according to an exemplary embodiment of the present disclosure. The hydrogen concentration estimation method for a fuel cell 100 according to the exemplary embodiment of the present disclosure includes estimating, by a controller 600, a gas discharge amount discharged through a discharge line 300 during operation of the fuel cell 100 (S100), cutting off, by the controller 600, a discharge valve 310 after estimation of the gas discharge amount, (S200) and then checking, by the controller 600, occurrence of degradation of the fuel cell 100 (S300), correcting, by the controller 600, a crossover coefficient value of the fuel cell 100 when the degradation of the fuel cell has occurred (S500), and estimating, by the controller 600, a hydrogen concentration in an interior of the fuel cell 100, based on the corrected crossover coefficient value (S600).

In the estimating a gas discharge amount (S100), the controller 600 determines a hydrogen supply amount based on a pressure measured by a pressure sensor, and estimates a gas discharge amount in a state of reflecting the determined hydrogen supply amount. The controller 600 may determine the hydrogen supply amount based on the pressure measured by pressure sensors 210 and 220, using a flow rate conversion map or a flow rate conversion formula. Furthermore, the controller 600 may determine a hydrogen consumption amount and a residual gas amount based on data obtained through a current sensor 400 and a cooling water temperature sensor 500, which are separately provided. The controller 600 may estimate the gas discharge amount discharged through the discharge line 300 by deducting the hydrogen consumption amount and the residual gas amount from the determined hydrogen supply amount. After completion of estimation of the gas discharge amount, the controller 600 cuts off the discharge valve 310 (S200).

In the checking occurrence of degradation of the fuel cell 100 (S300), the controller 600 determines a reduction amount reduced from the estimated gas discharge amount for a reference time after cut-off of the discharge valve 310 (S310), and then determines a difference between the reduction amount of the gas discharge amount and a reference reduction amount of the gas discharge amount, as a reduction variation amount (S320). The controller 600 determines a reduction amount of the gas discharge amount estimated for a predetermined reference time after cut-off of the discharge valve 310 (S310). Thereafter, the controller 600 determines a difference between the determined reduction amount of the gas discharge amount and the reference reduction amount of the gas discharge amount, as a reduction variation amount (S320). The reference reduction amount of the gas discharge amount is previously stored in the controller 600, and accordingly, it is necessary to check how much the reduction amount of the gas discharge amount is varied with respect to the reference reduction amount of the gas discharge amount.

Furthermore, in the checking occurrence of degradation of the fuel cell 100 (S300), the controller 600 compares the reduction variation amount of the gas discharge amount with a reference reduction variation amount (S330), and determines that degradation of the fuel cell 100 has occurred, when the reduction variation amount of the gas discharge amount is greater than the reference reduction variation amount (S340). The reference reduction variation amount is a reference for determining degradation of the fuel cell 100. The reference reduction variation amount represents a reduction variation amount of the gas discharge amount when occurrence of degradation has begun in the fuel cell 100. Accordingly, because the reference reduction variation amount of the gas discharge amount is previously stored in the controller 600, the controller 600 may check whether or not degradation of the fuel cell 100 has occurred, by comparing the determined reduction variation amount of the gas discharge amount with the reference reduction variation amount.

When the determined reduction variation amount of the gas discharge amount is greater than the reference reduction variation amount, it is determined that degradation of the fuel cell 100 has occurred (S340). However, when the determined reduction variation amount of the gas discharge amount is smaller than the reference reduction variation amount, it is determined that degradation has not occurred in the fuel cell 100, and accordingly, the controller 600 estimates a hydrogen concentration in the interior of the fuel cell 100 (S600).

In the correcting a crossover coefficient value of the fuel cell 100 (S500), the controller 600 derives a degradation rate of the fuel cell 100 based on the reduction variation amount of the gas discharge amount, when the degradation of the fuel cell has occurred (S400), and then corrects the crossover coefficient value of the fuel cell 100 based on the derived degradation rate of the fuel cell 100 (S500). The controller 600 is provided with a data map using, as an input thereof, the reduction variation amount of the gas discharge amount, and as an output thereof, the degradation rate of the fuel cell 100. Accordingly, when degradation of the fuel cell 100 has occurred, the controller 600 utilizes the data map provided to check a degradation level of the fuel cell 100. The controller 600 inputs a previously-determined reduction variation amount of the gas discharge amount, and then derives a degradation rate of the fuel cell 100 corresponding thereto (S400). The controller 600 may check a degradation level of the fuel cell 100 through the derived degradation rate of the fuel cell 100.

Thereafter, the controller 600 corrects a crossover coefficient value of the fuel cell 100 based on the derived degradation rate of the fuel cell 100 (S500). Furthermore, the controller 600 estimates the hydrogen concentration of the fuel cell hydrogen electrode in the interior of the fuel cell 100, using the corrected crossover coefficient value of the fuel cell 100 (S600).

The controller 600 has an effect of enhancing accuracy in estimation of the hydrogen concentration of the fuel cell hydrogen electrode in the interior of the fuel cell 100 by reflecting a variation in the interior of the fuel cell 10 caused by the crossover in the interior of the fuel cell 100 when degradation of the fuel cell 100 has occurred.

In accordance with the hydrogen concentration estimation system and method for the fuel cell according to the exemplary embodiments of the present disclosure, there is an effect of enhancing accuracy in estimation of a hydrogen concentration in an interior of the fuel cell by checking occurrence of degradation of the fuel cell during operation of the fuel cell, and estimating a hydrogen concentration in the interior of the fuel cell in a state of reflecting a degradation level of the fuel cell.

Furthermore, in accordance in accordance with an enhancement in accuracy in estimation of the hydrogen concentration in the interior of the fuel cell, there are effects of preventing a phenomenon in which a hydrogen concentration of a fuel cell hydrogen electrode is insufficient, and preventing a reduction in durability of the fuel cell caused by degradation of the fuel cell.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the FIGURES. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for estimating a hydrogen concentration of a fuel cell, the system comprising:
the fuel cell;
a discharge line connected to an outlet side of a fuel cell hydrogen electrode while connecting the fuel cell to an exterior of the fuel cell, for communication between the fuel cell and the exterior of the fuel cell;
a discharge valve provided at the discharge line and configured to adjust the communication between the fuel cell and the exterior of the fuel cell; and
a controller configured to estimate a gas discharge amount of gas discharged through the discharge line, to cut off the discharge valve after estimation of the gas discharge amount, to check occurrence of degradation of the fuel cell, and to correct a crossover coefficient value of the fuel cell in accordance with a level of the degradation in the fuel cell when the degradation of the fuel cell has occurred, estimating the hydrogen concentration in an interior of the fuel cell,
wherein the controller is configured to determine a reduction amount reduced from the estimated gas discharge amount for a reference time after cut-off of the discharge valve, and then to determine whether or not the degradation of the fuel cell has occurred, based on the determined reduction amount, and
wherein the controller is configured to determine a difference between the reduction amount of the gas discharge amount and a reference reduction amount of the gas discharge amount as a reduction variation amount, and then to conclude that the degradation has occurred in the fuel cell, when the determined reduction variation amount is greater than the reference reduction variation amount.

2. The system of claim 1, further including:
a hydrogen supply line connected to the fuel cell hydrogen electrode and configured to supply hydrogen to the fuel cell; and
a pressure sensor provided at the hydrogen supply line and configured to measure a pressure of the hydrogen supply line,
wherein the controller is configured to determine a hydrogen supply amount based on the pressure measured through the pressure sensor, and to estimate the gas discharge amount in a state of reflecting the determined hydrogen supply amount.

3. The system of claim 1, wherein the reference reduction amount of the gas discharge amount is a reduction amount of the gas discharge amount for the reference time in an initial state in which the fuel cell is not aged.

4. The system of claim 1, wherein the reference reduction variation amount is a minimum value of the reduction variation amount of the gas discharge amount when the degradation occurs in the fuel cell.

5. The system of claim 1, wherein the controller is configured to derive a degradation rate of the fuel cell based on the reduction variation amount determined when the degradation has occurred in the fuel cell, checking a degradation level of the fuel cell.

6. The system of claim 5, wherein the controller is provided with a data map using, as an input thereof, the reduction variation amount of the gas discharge amount, and as an output thereof, the degradation rate of the fuel cell according to the reduction variation amount of the gas discharge amount.

7. The system of claim 5, wherein the controller is configured to correct the crossover coefficient value of the fuel cell based on the derived degradation rate of the fuel cell, and to estimate the hydrogen concentration of the fuel cell hydrogen electrode in the interior of the fuel cell based on the corrected crossover coefficient value.

8. The system of claim 7, wherein, in the estimating the hydrogen concentration in the interior of the fuel cell, the controller is configured to determine a diffusion coefficient caused by crossover of the fuel cell, using the corrected crossover coefficient value, and then to estimate the hydrogen concentration of the fuel cell hydrogen electrode in the interior of the fuel cell, based on the determined diffusion coefficient.

9. A method for estimating a hydrogen concentration of a fuel cell, the method comprising:
estimating, by a controller, a gas discharge amount discharged through a discharge line during operation of the fuel cell;
cutting off, by the controller, a discharge valve after estimation of the gas discharge amount, and then checking, by the controller, occurrence of degradation of the fuel cell;
correcting, by the controller, a crossover coefficient value of the fuel cell when the degradation of the fuel cell has occurred; and
estimating, by the controller, the hydrogen concentration in an interior of the fuel cell, based on the corrected crossover coefficient value,
wherein, in the checking occurrence of degradation of the fuel cell, the controller is configured to determine a reduction amount reduced from the estimated gas discharge amount for a reference time after cut-off of the discharge valve, and then to determine a difference between the reduction amount of the gas discharge amount and a reference reduction amount of the gas discharge amount, as a reduction variation amount, and wherein, in the checking occurrence of degradation of the fuel cell, the controller is configured to compare the reduction variation amount of the gas discharge amount with a reference reduction variation amount, and to conclude that degradation of the fuel cell has occurred, when the reduction variation amount of the gas discharge amount is greater than the reference reduction variation amount.

10. The method of claim 9, wherein, in the estimating the gas discharge amount, the controller is configured to determine a hydrogen supply amount based on a pressure measured by a pressure sensor, and to estimate the gas discharge amount in a state of reflecting the determined hydrogen supply amount.

11. The method of claim 9, wherein the reference reduction amount of the gas discharge amount is a reduction amount of the gas discharge amount for the reference time in an initial state in which the fuel cell is not aged.

12. The method of claim 11, wherein the reference reduction variation amount is a minimum value of the reduction variation amount of the gas discharge amount when the degradation occurs in the fuel cell.

13. The method of claim 9, wherein, in the correcting the crossover coefficient value of the fuel cell, the controller is configured to derive a degradation rate of the fuel cell based on the reduction variation amount of the gas discharge amount, when the degradation of the fuel cell has occurred, and then to correct the crossover coefficient value of the fuel cell based on the derived degradation rate of the fuel cell.

14. The method of claim 9, wherein, in the estimating the hydrogen concentration in the interior of the fuel cell, the controller is configured to determine a diffusion coefficient caused by crossover of the fuel cell, using the corrected crossover coefficient value, and then to estimate the hydrogen concentration in the interior of the fuel cell, based on the determined diffusion coefficient.

* * * * *